Aug. 2, 1966  M. F. JORDAN ETAL  3,263,549
RETAINER FOR DIE OR PUNCH MEMBERS
Filed May 25, 1964

INVENTORS
MARVIN F. JORDAN
THADDEUS C. KLIMOWICZ
BY *Whittemore Hulbert*
*Belknap*
ATTORNEYS 3,263,549
RETAINER FOR DIE OR PUNCH MEMBERS
Marvin F. Jordan, Detroit, and Thaddeus C. Klimowicz, Drayton Plains, Mich., assignors to Acme Industrial Products, Inc., Royal Oak, Mich., a corporation of Michigan
Filed May 25, 1964, Ser. No. 369,929
16 Claims. (Cl. 83—698)

The present invention relates to improvements in a retainer for industrial press die or punch members, by means of which such members are removably mounted to the bed and/or slide shoe of the press, or to like supporting means fixedly associated with the relatively movable press parts, hence in effect components thereof. More particularly, the invention relates to a retainer for this purpose which has improved provisions enabling it to be quickly and easily stripped off the usual locating or aligning pins or dowels of the press part in question.

These pins are telescopingly received with extremely small, substantially frictional clearance in holes of the retainer; and the invention insures the separation of the retainer from the dowels without the possibility of damaging either the retainer or the locating pins, or both. The time and effort involved in this operation are insignificant as compared with retainer removing operations in the past.

Thus, it was once (and may now in some instances still be) the custom in removing a retainer mounting punch or die buttons of one sort or another of the press slide or bed shoe, to first remove screws or bolts which secure the retainer to the shoe, and then to invert this heavy and cumbersome shoe or like press member to allow access from its rear to drive out from the shoe the dowel pins with which the retainer holes were frictionally engaged, thus freeing the retainer from the shoe. This is of course a very tedious, time consuming and relatively difficult operation.

In the alternative, the retainer has in the past been removed from the shoe by hammering or prying manipulations, also difficult and time consuming and, worse, very likely to result in damage to either the retainer, the aligning dowel means, or both.

In attempts to improve on these procedures, it has been proposed to free the retainer from the press member, after removing its attaching bolts, by applying direct end pressure to the locating dowels or pins. In one instance this is to be accomplished through the agency of special screw or bolt means threadedly engaged with the retainer from the side of the retainer remote from the press shoe. This involves multiple manipulations, in both initially backing off and freeing the attaching bolts and then also applying force by the special removing bolt means to the pin or dowel ends.

In another instance it has been proposed to apply forces to the pin or dowel means from opposite sides of the retainer, i.e., upon an adjacent end of the dowel member and upon the side of the retainer opposite or remote from that dowel end. The objection is that this procedure requires special equipment which permits its clearance about the side of the retainer, and is also expensive.

Various sorts of other special appliances, generally similar in nature to hub pullers, have also been proposed for the purpose, but without general acceptance.

It is therefore a general object of the present invention to provide a punch or die button retainer which incorporates improved provisions for quickly and easily removing the same from a press shoe or equivalent part, without possibility of damaging the retainer itself or the locating dowel means of the press part, and in a manner to avoid the drawbacks of the previous procedures, some of which are mentioned above. This is done, speaking generally, by employing forces exercised in opposite directions directly between the retainer's fastener bolt itself (rather than the dowel or pin) and the body of the retainer proper. More particularly, for this purpose the retainer is provided with a fixed, but preferably removable, reaction member which receives thrust from the fastening bolt, hence enables the latter to serve as the dowel stripping member of the retainer.

With this general objective in mind, the invention specifically contemplates the provision of counterbored holes in the reatiner through which the fastening bolts extend to secure the retainer of the shoe, such bolts being of a conventional headed nature having a socket or similar end formation to receive a manipulating tool; and a tubular reaction member is mounted in fixed engagement with the retainer adjacent and in axial alignment with the bolt hole, and outwardly of the counterbore of the latter, in which counterbore the head of the bolt is received. That is, the reaction means is at the side of the retainer opposite its shoe engaging side.

Still more particularly, in accordance with the invention the bolt hole counterbore has a diameter substantially larger than the width of the head of the attaching bolt, being internally threaded at this diameter, and the tubular reaction member is threadedly engaged from the outside of the retainer with the threading of the counterbore. It in turn has a bore somewhat greater in diameter than the said tool receiving end formation of the bolt head, so that the reaction member will admit a tool, such as a socket wrench, to engage a socket formation in the bolt head; yet the bore of the tubular reaction member radially inwardly overlaps the bolt head itself.

Thus upon rotation of the fastening bolt reversely of its rotation in clamping, the bolt head will initailly engage the reaction member from the inner side of the latter, and a continuing reverse bolt rotation causes the bolt to not only thread itself out of the press shoe, but also to bodily separate the retainer from the shoe.

In general, it is an object of the invention to provide a retainer of the type described which is extremely simple and inexpensively produced as to its components, is quickly and easily manipulated in its removal from the press shoe without damage to any part, and which relies for this simplicity of construction and operation upon the use of but a single threadedly manipulable bolt means, in association with preferably removable reaction means, at each of the attaching through-holes of the retainer; rather than by multiple special provisions requiring different manipulations involving both the attaching bolts and the aligning pins or dowels, as in the heretofore most advanced proposals in the art.

The foregoing as well as other objects will become more apparent as this description proceeds, especially when considered in connection with the accompanying drawing illustrating the invention, wherein.

Figure 4:
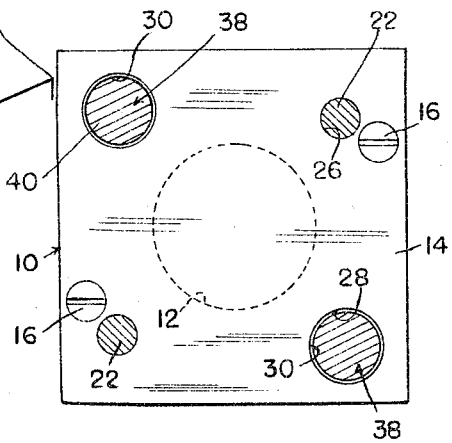
FIGURE 4 is a view in horizontal section along line 4—4 of FIGURES 2 and 3.
Figure 3:
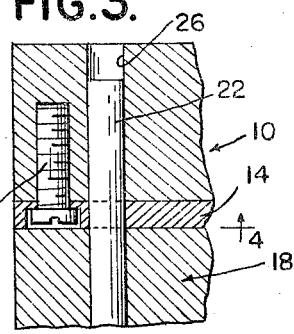
FIGURE 3 is a fragmentary view in vertical section somewhat similar to FIGURE 2, but in a plane including the dowel or pin means of the shoe or equivalent press part.

The retainer of the invention generally comprises a rather massive, block-like body, generally designated 10, which is provided with a recess 12 extending therethrough, and closed at one end by a flat pad or plate 14 secured to that end of the body by machine screws or bolts 16 (FIGURES 3 and 4). This is the end surface of the retainer structure which faces and flatwise engages the press punch or die shoe 18.

The body 10 and pad 14 are shown as square in shape, but may be of a different rectangular outline; and the recess 12, of which there may be more than one, is shown as being cylindrical, although it, too, may be of other cross sectional shape. Its well known purpose is to receive a piercing or blanking punch or die button, and to this end it is provided with a teardrop-shaped side recess 20 for the repection of a spring-urged punch or die member (not shown and of no particular significance in the present invention). Although herein illustrated and described in a known adaptation to a piercing and/or blanking operation, it will be appreciated by those skilled in the art that the retainer, considered as comprising the body 10 proper and pad 14, may be employed in removably mounting other types of forming or shaping tooling than piercing or blanking equipment. Hence the specification and claims to follow should be construed in this light.

In a conventional way, the shoe 18 is provided with a pair of retainer locating or aligning pins or dowels 22 projecting from the retainer-engaged face thereof, as well as a pair of threaded attaching holes 24. The respective dowels or pins 22 and holes 24 are located in diametrically opposed relation to one another across the tool receiving recess 12.

As for retainer 10, it is provided diagonally crosswise of the recess 12 with dowel or pin holes 26 opening through the pad 14 and shown as extending entirely through retainer body 10. These telescope with extremely slight clearance the respective pins 22 when the retainer is attached to shoe 18, this small clearance amounting to a frictional interfit requiring the retainer improvements of the invention to permit proper stripping of the retainer from the dowel means without possibility of damage to either.

Retainer body 10 and its pad 14 are provided, also diagonally across tool recess 12, with a pair of through-holes, generally designated 28. These holes are smooth-bored at 30 in the portion thereof adjacent, and which becomes aligned with, the threaded shoe holes 24, but they are counterbored at the opposite or upper portion thereof at 32. This counterbore is of substantial diameter, and is internally threaded at 34 up to and through the adjacent exposed surface 36 of retainer body 10, for purposes to be described.

Figure 1:
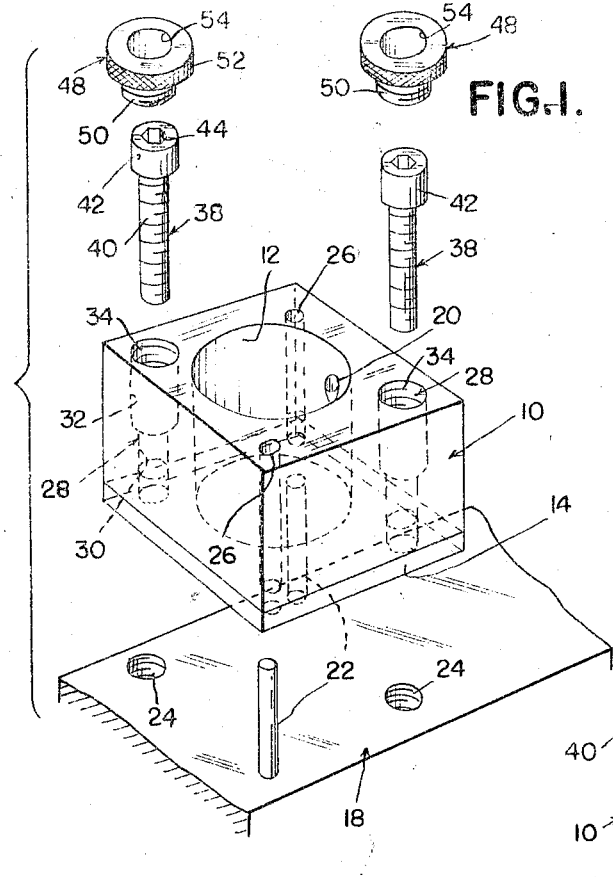
FIGURE 1 is a perspective exploded view showing components of the improved retainer in relation to a press shoe, its projecting retainer aligning pin or dowel means and its threaded retainer attaching holes.
Figure 5:
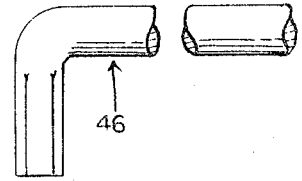
FIGURE 5 is a fragmentary view showing a type of socket tool or wrench employed in the attaching and removing operations on the retainer.
Figure 2:
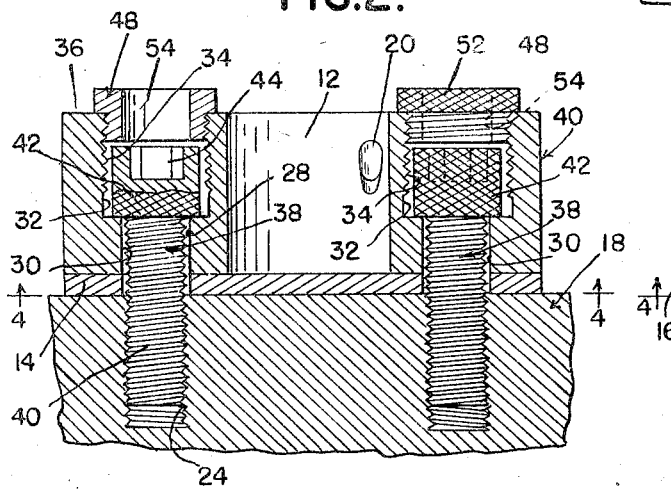
FIGURE 2 is a fragmentary enlarged view showing the retainer as attached to the shoe, this view being in axial section in a vertical plane through the attaching bolt provisions of the retainer and shoe.

A pair of headed attaching screws 38 are employed to secure the retainer to shoe 18; and it is seen by reference to FIGURE 2 that the threaded shank 40 of each screw 38, as threadedly engaged in the shoe holes 24, is received with side clearance in the smooth bore portion of the retainer hole 28, and has its enlarged bolt head 42 telescoped with substantial side clearance in the threaded counterbore 32 of the bolt hole. The bolt heads 40 are provided with angular-sided end socket formations or openings 44, for engagement by an Allen type socket wrench, such as is shown in FIGURE 5 and designated 46.

The improvement in regard to the retainer removing provisions of the invention is completed by a pair of tubular reaction members 48. These are externally threaded at 50 for engagement with the threading 34 of the bolt hole 32, and each reaction member 48 has an enlarged head 52 for threading manipulation by an operator. When member 48 is fully engaged in hole 32 (FIGURE 2), there is a slight axial clearance between it and bolt head 42 to permit initial unthreading of the bolt.

In accordance with the invention, and as best shown in FIGURE 2, the axial bore 54 of the annular or tubular reaction member 48 is somewhat greater than the maximum side-to-side dimension of the bolt head socket 44, so as to enable the socket wrench to be inserted through the reaction member for manipulating engagement with that recess. This would also be the case were the bolt head formation a screw driver kerf, or of hexagonal outer shape, or the like. Furthermore, the bore 54 inwardly over-extends or overlaps the sides of the bolt head, so as to render member 48 capable of acting as a reaction footing in axially restraining the bolt, after a predetermined preliminary rotation of the bolt oppositely of its direction of threading rotation in attaching retainer 10 to shoe 18. Inasmuch as it is not desired that this reverse, unthreading rotation of bolt 38 shall exert on reaction member 48 a substantial frictional force possibly capable of loosening the latter, the invention contemplates that the reaction member threads 50 shall be left-hand, as distinguished from a right-hand threading of the attaching bolt.

In the use of the improved retainer, as engaged at its holes 26 with the dowels or pins 22 of shoe 18 and secured in place, as shown in FIGURE 2, by the attaching bolts 40, and with the reaction members 48 fully applied and tightened, the retainer 10 is removed by simple alternating unthreading manipulations of the respective bolts 38. Wrench 46 is inserted through the reaction member bore 54 and engaged with the bolt socket 44. Progressive turnings of bolts 38 bring the bolt heads 42 axially upwardly into initial engagement with the respective reaction members; and continued consecutive and partial turnings cause the bolts to thrust strongly against the members 48 as the threaded bolt shanks 40 progress outwardly of the shoe holes 24.

Thus, the retainer 10 is removed from the press shoe 18 by the same manipulations otherwise required to initially unclamp the retainer from the shoe; and further dowel stripping procedure is unneeded. It is seen that the parts of the retainer, both those presently known and those proposed by the invention, are extremely simple and inexpensively produced, as well as quickly, easily and safely operated. As is clearly evident, the improvements of the invention are widely applicable to a large variety of different types of mounting means for tools of differing type.

While the invention as shown contemplates the use of reaction means removably applied fixedly to the retainer 10 by threadedly engaging the same in an enlarged bolt hole counterbore and, moreover, in the form of an annular threaded member having a tool-receiving bore 54, it should be understood that this practical and desirable arrangement is but illustrative of the principle of the invention. Thus, the invention contemplates the use of any appropriately acting reaction means which may be fixedly associated with the retainer body, or perhaps formed thereon, to act as a reaction restraint which limits outward unthreading of the bolt 38, while permitting its threading and unthreading rotation. Accordingly, the claims to follow should be considered in this broad light, unless otherwise specifically limited.

What we claim as our invention is:

1. An improvement in a press punch or die retainer having a hole therethrough opening toward a press member and receiving an element threadedly engageable with said member to removably mount the retainer to the press member, said retainer having means other than said element adapted to be telescopingly engageable with a formation of said press member to locate the retainer relative to said member; said improvement facilitating the separation of said press member formation and said retainer means from telescoped relation to one another, and comprising reaction means positioned in fixed relation to said retainer adjacent said hole to be engaged and urged in the axial direction of said element by a part of the latter upon unthreading rotation of the element, thus to cause movement of the retainer by the reaction means as said element moves axially in unthreading, with consequent axial separation of said formation of the press member and said retainer means relative to one another.

2. The improvement in accordance with claim 1, in which said reaction means comprises a reaction member on the side of said retainer opposite the press member, said reaction member having a hole in alignment with said press member adapted to receive means for the threading manipulation of said element, said member being axially engaged adjacent said hole by said element in the unthreading of the latter.

3. The improvement in accordance with claim 2, in which the reaction member is an annular, externally threaded one, said hole having a counterbore threadedly receiving said annular reaction member for removable engagement of the latter with said retainer.

4. The improvement in accordance with claim 2, in which the reaction member is an annular, externally threaded one, said hole having a counterbore threadedly receiving said annular reaction member for removable engagement of the latter with said retainer, said element having a head provided with means to rotatably actuate it, the bore of said threaded reaction member being of sufficient size to receive a tool to engage said last named means, while permitting engagement of the head of said element in unthreading with said reaction member outwardly of said bore.

5. The improvement in accordance with claim 2, in which the reaction member is an annular, externally threaded one, said hole having a counterbore threadedly receiving said annular reaction member for removable engagement of the latter with said retainer, said element having a head provided with means to rotatably actuate it, the bore of said threaded reaction member being of sufficient size to receive a tool to engage said last named means, while permitting engagement of the head of said element in unthreading with said reaction member outwardly of said bore, said threaded counterbore being of larger diameter than the width of said head to permit removal of said element from said retainer upon removal from the latter of said threaded reaction member.

6. A retainer for removably mounting a tool on a press shoe or like member, comprising a retainer body having a hole receiving an element threadedly engageable with a part of said press member to hold said retainer in aligned relation to said member, and means engaging said retainer body in fixed relation thereto adjacent the outer end of said hole for reaction with the outer end of said element upon unthreading movement of the latter in removing said retainer from said press member.

7. A retainer for removably mounting a tool on a press shoe or like member, comprising a retainer body having a hole receiving an element threadedly engageable with a part of said press member to hold said retainer in aligned relation to said member, and reaction means engaging said retainer body in fixed relation thereto adjacent the outer end of said hole for engagement by the outer end of said element to remove said retainer from said press member upon unthreading rotation of said element.

8. A retainer for removably mounting a tool on a press shoe or like member, comprising a retainer body having a hole receiving an element threadedly engageable with a part of said press member to hold said retainer in aligned relation to said member, and reaction means threadedly engaging said hole of said retainer body in fixed relation thereto adjacent the outer end of said hole for engagement by the outer end of said element to remove said retainer from said press member upon unthreading rotation of said element.

9. A retainer for removably attaching a forming part to a supporting member of a press or the like, comprising a retainer body having a through-hole facing said supporting member, a bolt in said hole threadedly engaging said supporting member to removably support the retainer body on said member, said body having a further hole in which a locating element on said supporting member is telescopingly received to align the retainer relative to said member, reaction means on said retainer body adjacent the outer end of said body through-hole, said reaction means being in fixed relation to said body and in part obstructing the bore of the latter, said bolt having a formation engageable by a tool to rotate the same, the outer end of said bolt engaging said reaction means upon unthreading rotation of the bolt to draw said retainer body away from said locating element.

10. A retainer for removably attaching a forming part to a supporting member of a press or the like, comprising a retainer body having a threaded through-hole facing said supporting member, a bolt in said hole threadedly engaging said supporting member to removably support the retainer body on said member, said body having a further hole in which a locating element on said supporting member is telescopingly received to align the retainer relative to said member, a tubular reaction member removably and threadedly engaged with said body in said body through-hole, said reaction member being in fixed relation to said body and having a bore sufficiently large to receive a tool therethrough for rotative actuating engagement with said bolt, said bolt engaging said tubular reaction member upon unthreading of the bolt to draw said retainer body away from said locating element.

11. A retainer in accordance with claim 10, in which said through-hole has a counterbore adjacent said reaction member, said bolt having an enlarged head in said counterbore inwardly of said reaction member, which head has a formation engaged by said tool to rotate the bolt.

12. A retainer in accordance with claim 10, in which said tubular reaction member has threading directed reversely of the threading of said bolt.

13. An improvement in a press punch or die retainer having a hole therethrough opening toward a press member and receiving an element threadedly engageable with said member to removably mount the retainer to the press member, and means telescopingly engageable with a formation of said press member to locate the retainer relative to said member; said improvement facilitating the separation of said press member formation and said retainer means from telescoped relation to one another, and comprising reaction means positioned in fixed relation to said retainer adjacent said hole to be engaged and urged in the axial direction of said element by a part of the latter upon unthreading rotation of the element, thus to cause movement of the retainer by the reaction means as said element moves axially in unthreading, with consequent axial separation of said formation of the press member and said retainer means relative to one another, said reaction means comprising a reaction member on the side of said retainer opposite the press member, said reaction member having a hole in alignment with said press member adapted to receive means for the threading manipulation of said element, said member being axially engaged adjacent said hole by said element in the unthreading of the latter.

14. An improvement in a press punch or die retainer having a hole therethrough opening toward a press member and receiving an element threadedly engageable with said member to removably mount the retainer to the press member, and means telescopingly engageable with a formation of said press member to locate the retainer relative to said member; said improvement facilitating the separation of said press member formation and said retainer means from telescoped relation to one another, and comprising reaction means positioned in fixed relation to said retainer adjacent said hole to be engaged and urged in the axial direction of said element by a part of the latter upon unthreading rotation of the element, thus to cause movement of the retainer by the reaction means as said element moves axially in unthreading, with consequent axial separation of said formation of the press member and said retainer means relative to one another, said reaction means comprising a reaction member on the side of said retainer opposite the press member, said reaction member having a hole in alignment with said press member adapter to receive means for the threading manipulation of said element, said member being axially engaged adjacent said hole by said element in the unthreading of the latter, said reaction member being an annular, externally threaded one, said hole having a counterbore threadedly receiving said annular reaction member for removable engagement of the latter with said retainer.

15. An improvement in a press punch or die retainer having a hole therethrough opening toward a press member and receiving an element threadedly engageable with said member to removably mount the retainer to the press member, and means telescopingly engageable with a formation of said press member to locate the retainer relative to said member; said improvement facilitating the separation of said press member formation and said retainer means from telescoped relation to one another, and comprising reaction means positioned in fixed relation to said retainer adjacent said hole to be engaged and urged in the axial direction of said element by a part of the latter upon unthreading rotation of the element, thus to cause movement of the retainer by the reaction means as said element moves axially in unthreading, with consequent axial separation of said formation of the press member and said retainer means relative to one another, said reaction means comprising a reaction member on the side of said retainer opposite the press member, said reaction member having a hole in alignment with said press member adapter to receive means for the threading manipulation of said element, said member being axially engaged adjacent said hole by said element in the unthreading of the latter, said reaction member being an annular, externally threaded one, said hole having a counterbore threadedly receiving said annular reaction member for removable engagement of the latter with said retainer, said element having a head provided with means to rotatably actuate it, the bore of said threaded reaction member being of sufficient size to receive a tool to engage said last named means, while permitting engagement of the head of said element in unthreading with said reaction member outwardly of said bore.

16. An improvement in a press punch or die retainer having a hole therethrough opening toward a press member and receiving an element threadedly engageable with said member to removably mount the retainer to the press member, and means telescopingly engageable with a formation of said press member to locate the retainer relative to said member; said improvement facilitating the separation of said press member formation and said retainer means from telescoped relation to one another, and comprising reaction means positioned in fixed relation to said retainer adjacent said hole to be engaged and urged in the axial direction of said element by a part of the latter upon unthreading rotation of the element, thus to cause movement of the retainer by the reaction means as said element moves axially in unthreading, with consequent axial separation of said formation of the press member and said retainer means relative to one another, said reaction means comprising a reaction member on the side of said retainer opposite the press member, said reaction member having a hole in alignment with said press member adapter to receive means for the threading manipulation of said element, said member being axially engaged adjacent said hole by said element in the unthreading of the latter, said reaction member being an annular, externally threaded one, said hole having a counterbore threadedly receiving said annular reaction member for removable engagement of the latter with said retainer, said element having a head provided with means to rotatably actuate it, the bore of said threaded reaction member being of sufficient size to receive a tool to engage said last named means, while permitting engagement of the head of said element in unthreading with said reaction member outwardly of said bore, said threaded counterbore being of larger diameter than the width of said head to permit removal of said element from said retainer upon removal from the latter of said threaded reaction member.

References Cited by the Examiner
UNITED STATES PATENTS

| | | | |
|---|---|---|---|
| 1,030,732 | 6/1912 | Jenkins | 81—53 |
| 2,674,026 | 4/1954 | Palley | 83—698 X |
| 2,751,006 | 6/1956 | Lane | 83—698 X |
| 2,916,813 | 12/1959 | Belanger | 29—256 |
| 3,034,464 | 5/1962 | Hrabal | 29—256 X |
| 3,103,845 | 9/1963 | Porter et al. | 83—698 |
| 3,106,122 | 10/1963 | Newcomb | 83—698 |

References Cited by the Applicant
UNITED STATES PATENTS

| | | |
|---|---|---|
| 2,299,703 | 10/1942 | Schwabe. |
| 2,305,076 | 12/1942 | Graham. |
| 2,684,527 | 7/1954 | Hedlund. |
| 3,056,191 | 10/1962 | Felmet. |

WILLIAM W. DYER, JR., *Primary Examiner.*

J. M. MEISTER, *Assistant Examiner.*